US012646827B2

(12) United States Patent
Goto

(10) Patent No.: US 12,646,827 B2

(45) Date of Patent: Jun. 2, 2026

(54) ANTENNA DEVICE HAVING A PLURALITY OF RESONANCE FREQUENCIES

(71) Applicant: TDK Corporation, Tokyo (JP)

(72) Inventor: Tetsuzo Goto, Tokyo (JP)

(73) Assignee: TDK Corporation, Tokyo (JP)

(*) Notice: Subject to any disclaimer, the term of this patent is extended or adjusted under 35 U.S.C. 154(b) by 141 days.

(21) Appl. No.: 18/528,081

(22) Filed: Dec. 4, 2023

(65) Prior Publication Data

US 2024/0186702 A1 Jun. 6, 2024

(30) Foreign Application Priority Data

Dec. 5, 2022 (JP) ................................ 2022-194034

(51) Int. Cl.
*H01Q 1/38* (2006.01)
*H01Q 5/371* (2015.01)
*H01Q 5/50* (2015.01)

(52) U.S. Cl.
CPC ............... *H01Q 1/38* (2013.01); *H01Q 5/371* (2015.01); *H01Q 5/50* (2015.01)

(58) Field of Classification Search
None
See application file for complete search history.

(56) References Cited

U.S. PATENT DOCUMENTS 6,034,640 A * 3/2000 Oida ...................... H01Q 1/362 343/722
7,598,921 B2 * 10/2009 Ge .......................... H01Q 9/42 343/700 MS
8,581,799 B2 * 11/2013 Choi ...................... H01Q 5/335 343/846
10,522,902 B1 * 12/2019 Tseng ....................... H01Q 1/48
11,515,632 B2 * 11/2022 Chang ...................... H01Q 5/35
11,929,560 B2 * 3/2024 Komura ................... H01Q 5/20
2003/0080904 A1 * 5/2003 Chen ........................ H01Q 9/42 343/846
2007/0285335 A1 * 12/2007 Bungo .................. H01Q 5/371 343/895
2013/0088398 A1 * 4/2013 Utagawa ................. H01Q 1/38 343/745
2013/0249742 A1 * 9/2013 Yukimoto ............ H01Q 1/2283 343/700 MS (Continued)

FOREIGN PATENT DOCUMENTS

CN 211789520 U * 10/2020
JP 2014127946 A * 7/2014 ........... H05K 1/0243

(Continued)

*Primary Examiner* — Ab Salam Alkassim, Jr.

(74) *Attorney, Agent, or Firm* — Rimon P.C.

(57) ABSTRACT

Disclosed herein is an antenna device that includes a substrate, a ground pattern provided on a surface of the substrate, an antenna element mounted on the surface of the substrate, and first and second conductor patterns provided in a ground clearance area free from the ground pattern on the surface of the substrate. The first conductor pattern extends in a first direction, and the second conductor pattern extends in a direction different from the first direction. One end of the first conductor pattern is connected to the antenna element, and another end of the first conductor pattern is connected to a connection point positioned between both ends of the second conductor pattern.

12 Claims, 6 Drawing Sheets

(56) References Cited

U.S. PATENT DOCUMENTS

| | | | | |
|---|---|---|---|---|
| 2015/0022422 A1* | 1/2015 | Chang | H01Q 1/243 | 343/861 |
| 2015/0035713 A1* | 2/2015 | Goto | H01Q 5/50 | 343/749 |
| 2015/0236417 A1* | 8/2015 | Lellci | H01Q 5/328 | 343/700 MS |
| 2016/0181698 A1* | 6/2016 | Goto | H01Q 1/362 | 343/870 |
| 2018/0076527 A1* | 3/2018 | Chen | H01Q 1/36 | |
| 2018/0316088 A1* | 11/2018 | Wen | H01Q 21/28 | |
| 2020/0388925 A1* | 12/2020 | Tanbo | H01Q 5/371 | |
| 2022/0271429 A1* | 8/2022 | Kosaka | H01Q 1/38 | |
| 2022/0393360 A1* | 12/2022 | Zhang | H01Q 1/2291 | |
| 2025/0007167 A1* | 1/2025 | Hanninen | H01Q 9/0414 | |

FOREIGN PATENT DOCUMENTS

| | | | | | |
|---|---|---|---|---|---|
| JP | 2014150502 | A | * | 8/2014 | |
| JP | 2014233030 | A | * | 12/2014 | |
| JP | 2015-033049 | A | | 2/2015 | |
| JP | 2016134773 | A | * | 7/2016 | |
| JP | 2017038153 | A | * | 2/2017 | |
| WO | WO-2012138050 | A2 | * | 10/2012 | H01Q 1/243 |

* cited by examiner

ANTENNA DEVICE HAVING A PLURALITY OF RESONANCE FREQUENCIES

CROSS-REFERENCE TO RELATED APPLICATION

This application claims the benefit of Japanese Patent Application No. 2022-194034, filed on Dec. 5, 2022, the entire disclosure of which is incorporated by reference herein.

BACKGROUND OF THE ART

Field of the Art

The present disclosure relates to an antenna device and, more particularly, to an antenna device having a plurality of resonance frequencies.

Description of Related Art

An antenna device disclosed in JP 2015-033049A has a plurality of conductor patterns and an antenna element in a ground clearance area on a substrate. The two conductor patterns connected to the antenna element have mutually different lengths, whereby two resonance points of different frequencies are achieved.

There may be a case where three or more resonance points of different frequencies are required in some applications of an antenna device.

SUMMARY

The present disclosure describes an antenna device having three or more resonance points.

An antenna device according to one aspect of the present disclosure includes a substrate, a ground pattern provided on a surface of the substrate, an antenna element mounted on the surface of the substrate, and first and second conductor patterns provided in a ground clearance area free from the ground pattern on the surface of the substrate. The first conductor pattern extends in a first direction, and the second conductor pattern extends in a direction different from the first direction. One end of the first conductor pattern is connected to the antenna element, and another end of the first conductor pattern is connected to a connection point positioned between both ends of the second conductor pattern.

BRIEF DESCRIPTION OF THE DRAWINGS

The above features and advantages of the present disclosure will be more apparent from the following description of certain preferred embodiments taken in conjunction with the accompanying drawings, in which.

DETAILED DESCRIPTION OF THE EMBODIMENTS

Preferred embodiments of the present disclosure will be explained below in detail with reference to the accompanying drawings.

Figure 1:
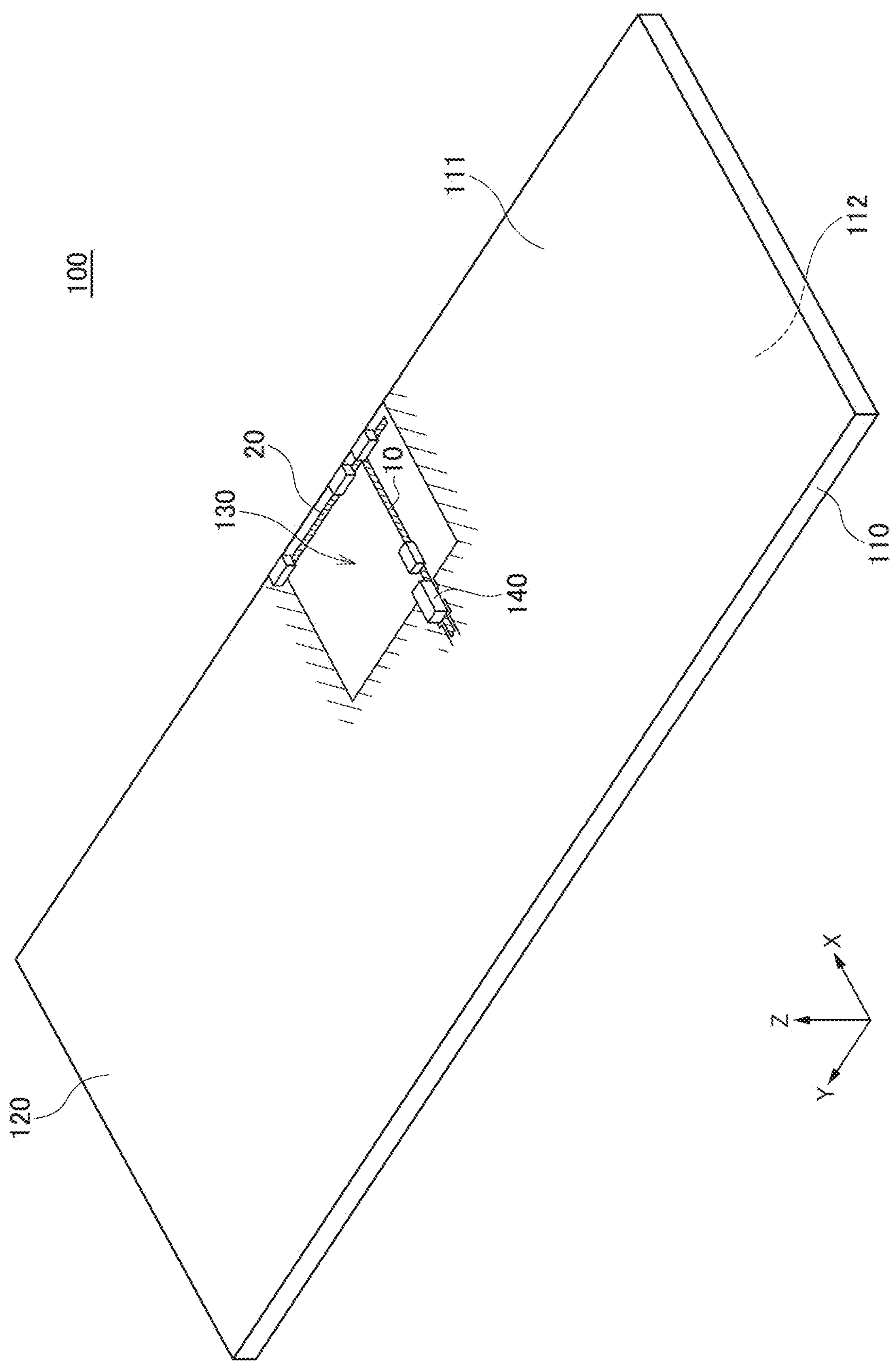
FIG. 1 is a schematic perspective view illustrating the outer appearance of an antenna device 100 according to an embodiment of the disclosed technology.

FIG. 1 is a schematic perspective view illustrating the outer appearance of an antenna device 100 according to an embodiment of the disclosed technology.

As illustrated in FIG. 1, the antenna device 100 according to the present embodiment includes a substrate 110 having a main surface constituting the XY plane, an antenna element 140 mounted on the substrate 110, and conductor patterns 10 and 20 provided on the substrate 110. The substrate 110 is made of an insulating material such as epoxy resin, and a ground pattern 120 is formed so as to cover a major part of both the front and back surfaces 111 and 112. Further, a ground clearance area 130, which is obtained by cutting and removing the ground pattern 120, is provided on both the front and back surfaces 111 and 112. The ground clearance area 130 provided on the front surface 111 of the substrate 110 and ground clearance area 130 provided on the back surface 112 of the substrate 110 overlap each other in the Z-direction. The conductor patterns 10 and 20 are formed within the ground clearance area 130 provided on the front surface 111 of the substrate 110.

Figure 2:
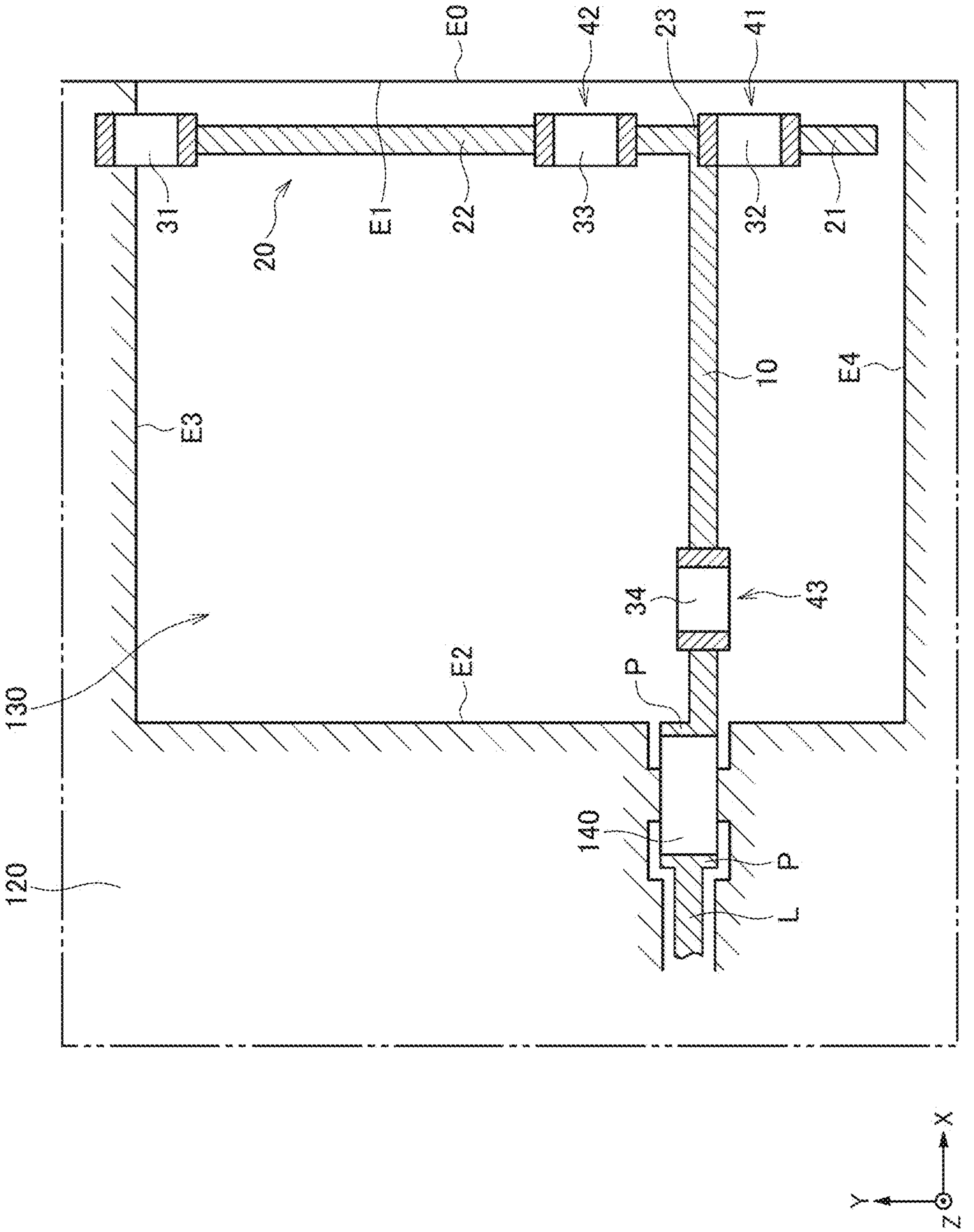
FIG. 2 is an enlarged plan view of the ground clearance area 130 and its vicinity.

FIG. 2 is an enlarged plan view of the ground clearance area 130 and its vicinity.

As illustrated in FIG. 2, the ground clearance area 130 is surrounded by an edge E1 constituted by an edge E0 of the substrate 110 that extends in the Y-direction, an edge E2 extending parallel to the edge E1, and edges E3 and E4 extending in the X-direction. The edges E1 to E4 thus define the ground clearance area 130, and the edges E2 to E4 constitute the boundary between the ground pattern 120 and the ground clearance area 130. In the example illustrated in FIG. 2, the edges E1 and E2 linearly extend in the Y-direction, and the edges E3 and E4 linearly extend in the X-direction. Thus, the edge E3 linearly connects one end of the edge E1 in the Y-direction and one end of the edge E2 in the Y-direction, and the edge E4 linearly connects the other end of the edge E1 in the Y-direction and the other end of the edge E2 in the Y-direction. The length of the edges E1 and E2 in the Y-direction is larger than the length of the edges E3 and E4 in the X-direction, so that the ground clearance area 130 has a rectangular shape. However, the edges E1 and E2 may extend inclined to the Y-direction, and edges E3 and E4 may extend inclined to the X-direction. Further, the edges E1 to E4 may have an irregularity part or a curved portion.

The conductor patterns 10 and 20 are provided within the ground clearance area 130. The conductor pattern 10 extends in the X-direction, and one end thereof is connected to the antenna element 140. The position of the conductor pattern 10 in the Y-direction is offset to the edge E4 side. That is, the distance between the conductor pattern 10 and the edge E4 in the Y-direction is smaller than the distance between the conductor pattern 10 and the edge E3 in the y-direction. The conductor pattern 20 extends in the Y-direction along the edge E1. The conductor pattern 20 has a connection point 23 positioned between one end and the other end thereof, and the other end of the conductor pattern 10 is connected to the connection point 23 of the conductor pattern 20. Thus, the conductor patterns 10 and 20 are laid out in a substantially T shape.

The conductor pattern 10 may be a continuous pattern extending in the X-direction; however, in the example illustrated in FIG. 2, the conductor pattern 10 is divided at a dividing region 43 in the middle thereof, and a frequency adjustment element 34 is disposed at the dividing region 43. The frequency adjustment element 34 is a chip type inductor element that connects the divided parts of the conductor pattern 10. The position of the dividing region 43 in the X-direction is offset to the antenna element 140 side. That is, one of the two divided parts of the conductor pattern 10 that is connected to the antenna element 140 is smaller in length than the other one thereof that is connected to the connection point 23 of the conductor pattern 20. In other words, the dividing region 43 of the conductor pattern 10 is closer to the edge E2 than to the edge E1. However, the conductor pattern 10 need not necessarily extend exactly in the X-direction but may extend in a direction inclined to the X-direction or may include a meandering part.

The conductor pattern 20 is divided into sections 21 and 22 with the connection point 23 as a boundary. The section 21 extends toward the edge E4 from the connection point 23, and the section 22 extends toward the edge E3 from the connection point 23. The length of the section 21 in the Y-direction is smaller than the length of the section 22 in the y-direction. However, it is not essential that both the sections 21 and 22 extend in the Y-direction, but one or both of them may extend in a direction inclined to the Y-direction or may include a meandering part.

The end portion of the section 21 that faces the edge E4 is opened without being connected to the ground pattern 120 directly or through a chip component. On the other hand, the end portion of the section 22 that faces the edge E3 is connected to the ground pattern 120 through a frequency adjustment element 31. The frequency adjustment element 31 is a chip type capacitor element that connects the conductor pattern 20 and the ground pattern 120.

The section 21 of the conductor pattern 20 may be a continuous pattern extending in the Y-direction; however, in the example illustrated in FIG. 2, the section 21 is divided at a dividing region 41 in the middle thereof, and a frequency adjustment element 32 is disposed at the dividing region 41. The frequency adjustment element 32 is a chip type inductor element that connects the divided parts of the section 21. The position of the dividing region 41 in the Y-direction is offset to the connection point 23 side. That is, one of the two parts of the section 21 divided by the dividing region 41 that is connected to the connection point 23 is smaller in length than the other one thereof that faces the edge E4.

The section 22 of the conductor pattern 20 may be a continuous pattern extending in the Y-direction; however, in the example illustrated in FIG. 2, the section 22 is divided at a dividing region 42 in the middle thereof, and a frequency adjustment element 33 is disposed at the dividing region 42. The frequency adjustment element 33 is a chip type capacitor element or a chip type inductor element that connects the divided parts of the section 22. The position of the dividing region 42 in the Y-direction is offset to the connection point 23 side. That is, one of the two parts of the section 22 divided by the dividing region 42 that is connected to the connection point 23 is smaller in length than the other one thereof that faces the edge E3.

Further, in the example illustrated in FIG. 2, the antenna element 140 is mounted outside the ground clearance area 130 as viewed from the edge E2. The antenna element 140 need not necessarily be disposed outside the ground clearance area 130; however, disposing the antenna element 140 outside the ground clearance area 130 facilitates pattern design inside the ground clearance area 130. There is provided, on the front surface 111 of the substrate 110 on which the antenna element 140 is mounted, a land pattern P for connecting to a terminal electrode provided in the antenna element 140.

Figure 3:
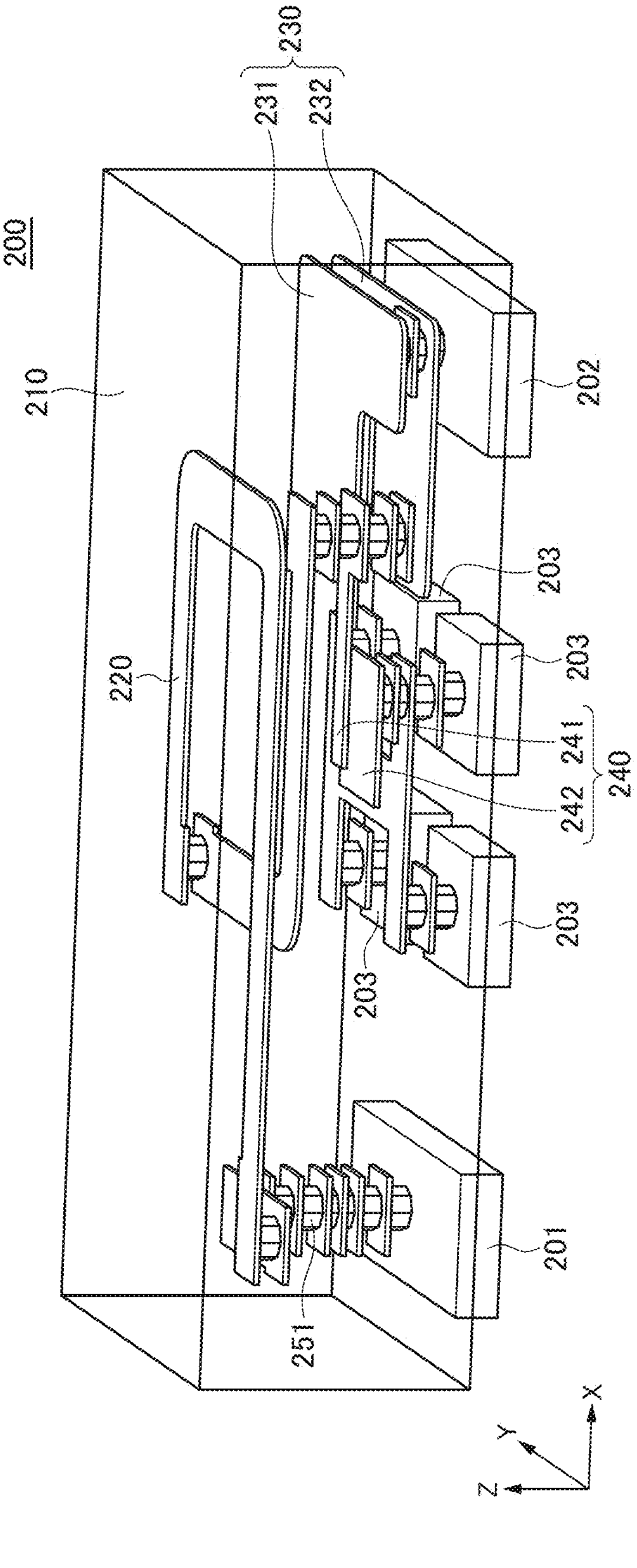
FIG. 3 is a schematic transparent perspective view of the antenna element 140.
Figure 4:
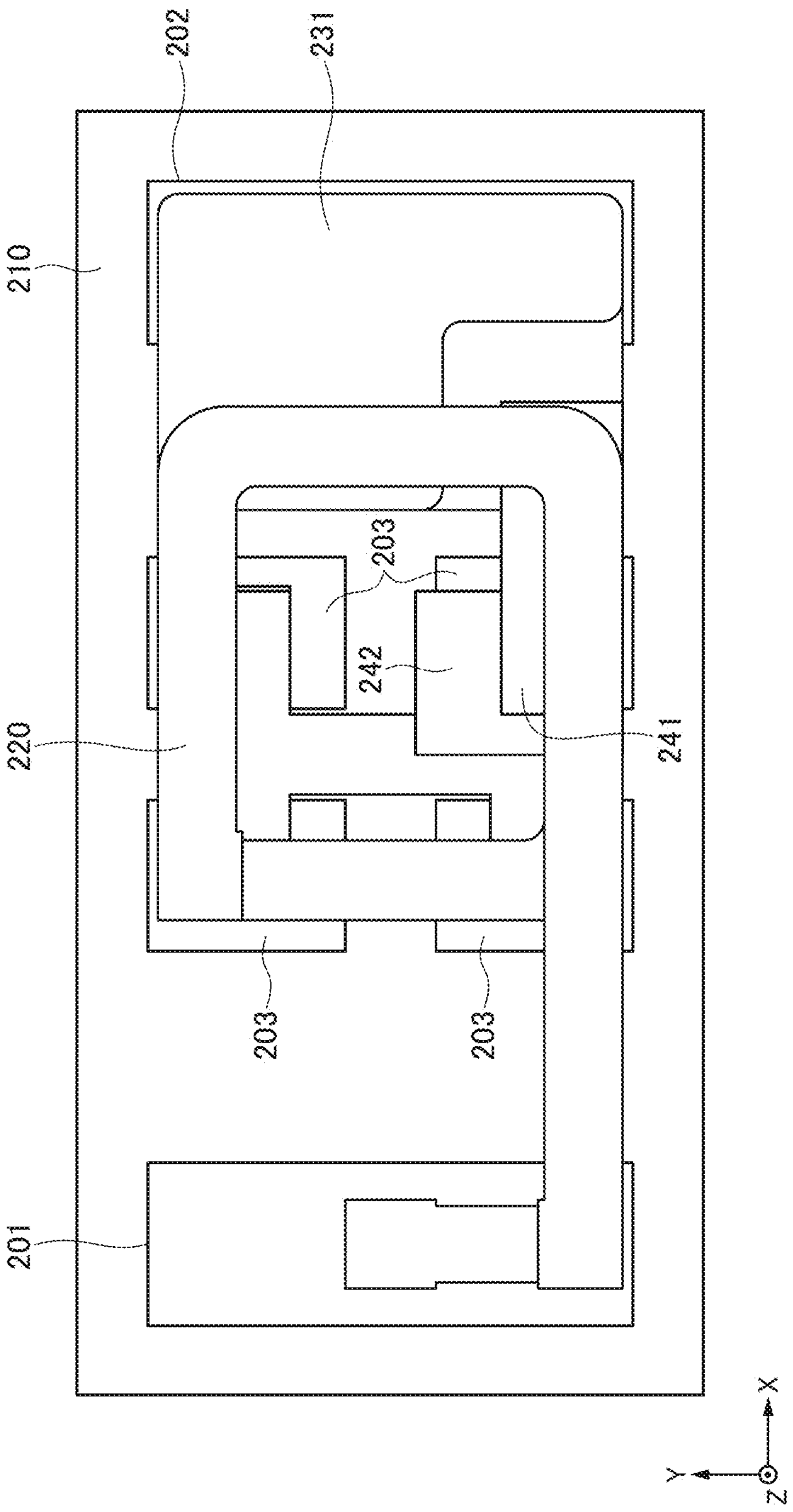
FIG. 4 is a schematic transparent plan view of the antenna element 140.
Figure 5:
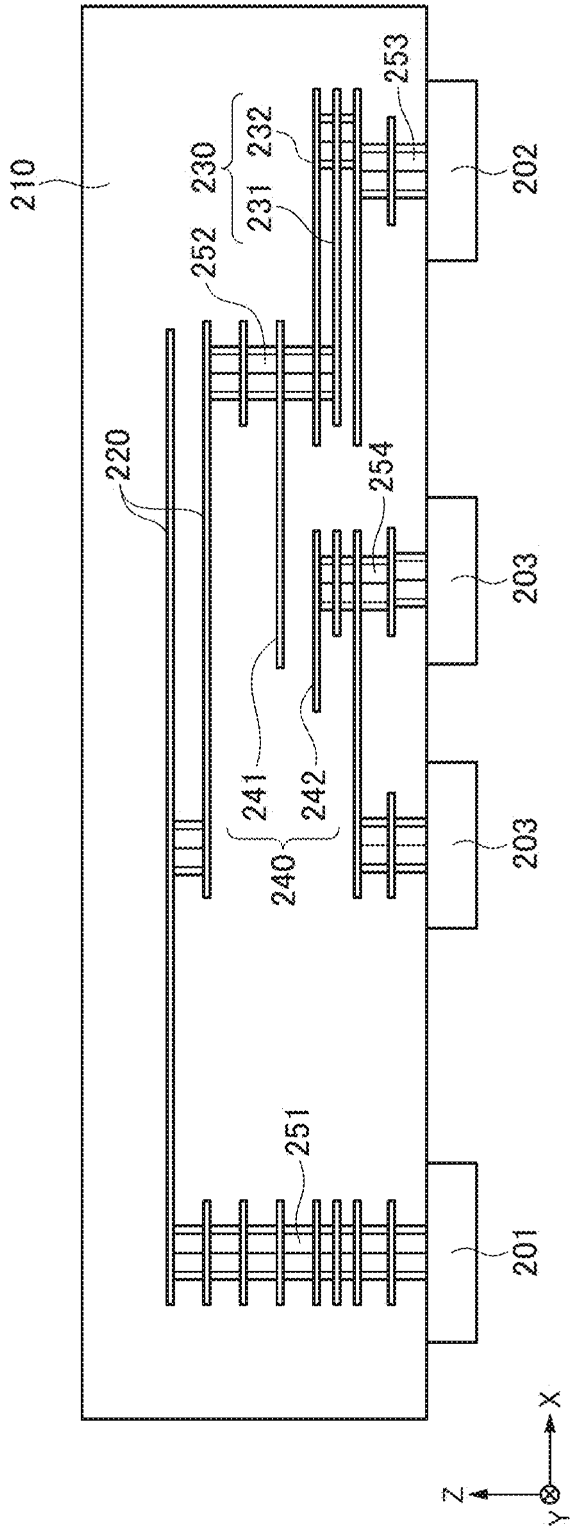
FIG. 5 is a schematic transparent side view of the antenna element 140.

FIGS. 3 to 5 are views for explaining the structure of the antenna element 140. FIG. 3 is a schematic transparent perspective view, FIG. 4 is a schematic transparent plan view, and FIG. 5 is a schematic transparent side view.

As illustrated in FIGS. 3 to 5, the antenna element 140 includes a conductor pattern embedded in an element body 210 made of an insulating material such as resin and signal terminals 201, 202 and a plurality of ground terminals 203. The signal terminals 201, 202 and ground terminals 203 are provided on the surface of the element body 210. The signal terminal 201 is connected to a not illustrated RFIC or the like through a signal line L provided on the substrate 110. The signal terminal 202 is connected to one end of the conductor pattern 10. The ground terminals 203 are connected to the ground pattern 120.

The conductor pattern embedded in the element body 210 includes an inductor pattern 220 and capacitor patterns 230 and 240. One end of the inductor pattern 220 is connected to the signal terminal 201 through a via conductor 251, and the other end thereof is connected to one (capacitive electrode pattern 231) of capacitive electrode patterns that constitute the capacitor pattern 230 through a via conductor 252. The other one (capacitive electrode pattern 232) of capacitive electrode patterns that constitute the capacitor pattern 230 is connected to the signal terminal 202 through a via conductor 253. One (capacitive electrode pattern 241) of capacitive electrode patterns that constitute the capacitor pattern 240 is branched from the via conductor 252. The other one (capacitive electrode pattern 242) of capacitive electrode patterns that constitute the capacitor pattern 240 is connected in common to the plurality of ground terminal 203 through a via conductor 254.

With the above configuration, the antenna element 140 constitutes an LC circuit and functions as a matching element for obtaining desired antenna characteristics. On the other hand, the frequency adjustment elements 31 to 34 mounted within the ground clearance area 130 are used for finely adjusting a resonance frequency. Therefore, one or two or more of the frequency adjustment elements 31 to 34 can be omitted.

The above is the structure of the antenna device 100 according to the present embodiment. The antenna device 100 according to the present embodiment can achieve a resonance in a plurality of frequency bands with the above configuration.

First, in the antenna device 100 according to the present embodiment, a resonance in a low frequency band is generated by the conductor pattern 10 and the section 22 of the conductor pattern 20. The frequency and bandwidth of the resonance is mainly determined by the lengths of the conductor pattern 10 and the section 22 of the conductor pattern 20 and can further be finely adjusted by the positions of the frequency adjustment elements 31 to 34 and a capacitance or an inductance. Second, in the antenna device 100 according to the present embodiment, a resonance in an intermediate frequency band is generated by the conductor pattern 10 and the section 21 of the conductor pattern 20. The frequency and bandwidth of the resonance is mainly determined by the lengths of the conductor pattern 10 and the section 21 of the conductor pattern 20 and can further be finely adjusted by the positions of the frequency adjustment elements 32 and 34 and an inductance. Third, in the antenna device 100 according to the present embodiment, a resonance in a high frequency band is generated by the conductor pattern 10. The frequency and bandwidth of the resonance is mainly determined by the length of the conductor pattern 10 and can further be finely adjusted by the position of the frequency adjustment element 34 and an inductance. As described above, the antenna device 100 according to the present embodiment can achieve a resonance in three frequency bands.

Figure 6:
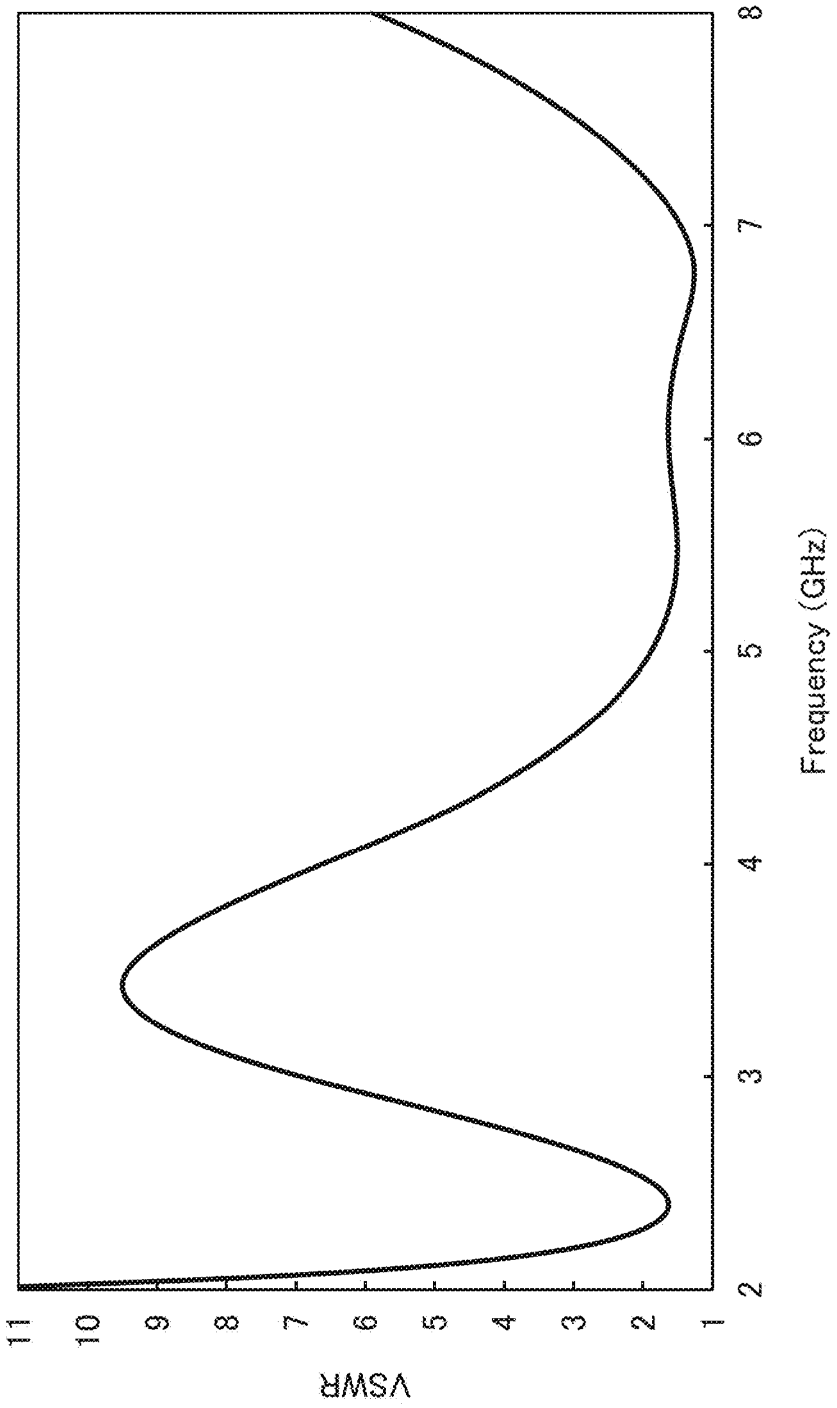
FIG. 6 is a graph illustrating VSWR characteristics of the antenna device 100.

FIG. 6 is a graph illustrating VSWR characteristics of the antenna device 100 according to the present embodiment.

As illustrated in FIG. 6, peaks of the VSWR characteristics appear in the vicinity of 2.4 GHZ (low frequency band), in the vicinity of 5 GHZ (intermediate frequency band), and in the vicinity of 7 GHZ (high frequency band). Although the VSWR characteristics deteriorate in a frequency band between the low and intermediate frequency bands, the intermediate and high frequency bands are almost continuous, and satisfactory VSWR characteristics are widely obtained thereover. Thus, it is possible to achieve high antenna characteristics in the vicinity of 2.4 GHZ (low frequency band) and further to achieve high antenna characteristics over about 5 GHZ to about 7 GHZ (intermediate to high frequency bands).

As described above, the antenna device 100 according to the present embodiment can achieve a plurality of resonance frequencies with a simple configuration and achieve high antenna characteristics over a wide frequency band from intermediate to high frequency bands.

While the preferred embodiment of the present disclosure has been described, the present disclosure is not limited to the above embodiment, and various modifications may be made within the scope of the present disclosure, and all such modifications are included in the present disclosure.

The technology according to the present disclosure includes the following configuration examples but not limited thereto.

An antenna device according to one aspect of the present disclosure includes: a substrate; a ground pattern provided on the surface of the substrate; an antenna element mounted on the surface of the substrate; and first and second conductor patterns provided in a ground clearance area obtained by cutting and removing the ground pattern on the surface of the substrate. The first conductor pattern extends in a first direction, and the second conductor pattern extends in a direction different from the first direction. One end of the first conductor pattern is connected to the antenna element, and the other end thereof is connected to a connection point positioned between both ends of the second conductor pattern. This allows a plurality of resonance frequencies to be achieved with a simple structure.

In the above antenna device, the second conductor pattern may extend in a second direction perpendicular to the first direction. This allows achievement of high antenna characteristics.

In the above antenna device, the substrate may have an edge extending in the second direction, the ground clearance area may have a first edge constituted by the edge of the substrate, a second edge extending parallel to the first edge, and third and fourth edges extending in the first direction, and the second conductor pattern may extend along the first edge. This allows achievement of higher antenna characteristics.

In the above antenna device, a first frequency adjustment element may be connected between one end of the second conductor pattern that faces the third edge and the ground pattern. This allows fine adjustment of a resonance frequency.

In the above antenna device, the other end of the second conductor pattern that faces the fourth edge may be opened. This facilitates formation of a resonance point in an intermediate frequency band.

In the above antenna device, a first section positioned between the other end of the second conductor pattern and the connection point may be smaller in length than a second section positioned between the one end of the second conductor pattern and the connection point. This allows two resonance points of different frequencies to be achieved.

In the above antenna device, the first section of the second conductor pattern may be divided at a first dividing region, and a second frequency adjustment element may be provided at the first dividing region. This allows fine adjustment of a resonance frequency in an intermediate frequency band.

In the above antenna device, the second section of the second conductor pattern may be divided at a second dividing region, and a third frequency adjustment element may be provided at the second dividing region. This allows fine adjustment of a resonance frequency in a low frequency band.

In the above antenna device, the first conductor pattern may be divided at a third dividing region, and a fourth frequency adjustment element may be provided at the third dividing region. This allows fine adjustment of a resonance frequency in a high frequency band.

In the above antenna device, the third dividing region may be closer to the second edge than to the first edge. This can increase a resonance frequency in a high frequency band.

In the above antenna device, the antenna element may be provided outside the ground clearance area as viewed from the second edge. This facilitates pattern design inside the ground clearance area.

The above antenna device may have a first resonance frequency, a second resonance frequency higher than the first resonance frequency, and a third resonance frequency higher than the second resonance frequency. This allows achievement of three resonance frequencies.

What is claimed is:

1. An antenna device comprising:
a substrate;
a ground pattern provided on a surface of the substrate;
an antenna element mounted on the surface of the substrate; and
first and second conductor patterns provided in a ground clearance area free from the ground pattern on the surface of the substrate,
wherein the first conductor pattern extends in a first direction,
wherein the second conductor pattern extends in a second direction perpendicular to the first direction,
wherein one end of the first conductor pattern is connected to the antenna element,
wherein another end of the first conductor pattern is connected to a connection point positioned between both ends of the second conductor pattern,
wherein the substrate has an edge extending in the second direction,
wherein the ground clearance area has a first edge constituted by the edge of the substrate, a second edge extending parallel to the first edge, and third and fourth edges extending in the first direction, wherein the second conductor pattern extends along the first edge, wherein a first frequency adjustment element is connected between one end of the second conductor pattern that faces the third edge and the ground pattern, wherein another end of the second conductor pattern that faces the fourth edge is opened, wherein the second conductor pattern has a first section positioned between the another end of the second conductor pattern and the connection point and a second section positioned between the one end of the second conductor pattern and the connection point, and wherein the first section is smaller in length than the second section.

2. The antenna device as claimed in claim 1, wherein the first section of the second conductor pattern is divided at a first dividing region, and wherein a second frequency adjustment element is provided at the first dividing region.

3. The antenna device as claimed in claim 2, wherein the second section of the second conductor pattern is divided at a second dividing region, and wherein a third frequency adjustment element is provided at the second dividing region.

4. The antenna device as claimed in claim 1, wherein the first conductor pattern is divided at a dividing region, and wherein an additional frequency adjustment element is provided at the dividing region.

5. The antenna device as claimed in claim 4, wherein the dividing region is closer to the second edge than to the first edge.

6. The antenna device as claimed in claim 1, wherein the above antenna device has a first resonance frequency, a second resonance frequency higher than the first resonance frequency, and a third resonance frequency higher than the second resonance frequency.

7. An antenna device comprising:

a substrate;

a ground pattern provided on a surface of the substrate such that a ground clearance area that is free from the ground pattern is defined;

a first conductor pattern provided in the ground clearance area and extend in a first direction; and a second conductor pattern provided in the ground clearance area and extend in a second direction perpendicular to the first direction, wherein the substrate has an edge extending in the second direction, wherein the ground clearance area has a first edge constituted by the edge of the substrate, a second edge extending parallel to the first edge, and third and fourth edges extending in the first direction, wherein the first conductor pattern has a first end connected to an antenna element and a second end, wherein the second conductor pattern extends along the first edge and has a third end connected to the third edge via a first frequency adjustment element and a fourth end that is opened without being connected to the fourth edge, wherein the second end of the first conductor pattern is connected to a connection point of the second conductor pattern positioned between the third and fourth ends, wherein the second conductor pattern has a first section positioned between the fourth end and the connection point and a second section positioned between the third end and the connection point, and wherein the first section is smaller in length than the second section.

8. The antenna device as claimed in claim 7, wherein no conductor pattern exists between the first conductor pattern and the third edge in the second direction.

9. The antenna device as claimed in claim 8, wherein no conductor pattern exists between the first conductor pattern and the fourth edge in the second direction.

10. The antenna device as claimed in claim 7, wherein no conductor pattern exists between the first section of the second conductor pattern and the second edge in the first direction.

11. The antenna device as claimed in claim 10, wherein no conductor pattern exists between the second section of the second conductor pattern and the second edge in the first direction.

12. The antenna device as claimed in claim 7, wherein the antenna element is provided outside the ground clearance area as viewed from the second edge.

* * * * *